United States Patent [19]
Van Rossen et al.

[11] Patent Number: 5,630,940
[45] Date of Patent: May 20, 1997

[54] FILTER DEVICE FOR THE FILTRATION OF FLUIDS

[75] Inventors: Leonard M. Van Rossen, Bunnik; Bertus Dijkman, Breda, both of Netherlands

[73] Assignee: Minnesota Mining and Manufacturing Company, St. Paul, Minn.

[21] Appl. No.: 513,882

[22] PCT Filed: Feb. 22, 1994

[86] PCT No.: PCT/US94/01974

§ 371 Date: Aug. 30, 1995

§ 102(e) Date: Aug. 30, 1995

[87] PCT Pub. No.: WO94/22557

PCT Pub. Date: Oct. 13, 1994

[30] Foreign Application Priority Data

Apr. 1, 1993 [DE] Germany ............................ 43 10 664.1

[51] Int. Cl.⁶ .......................... B01D 27/06; B01D 27/14
[52] U.S. Cl. .......................... 210/484; 210/489; 210/492; 210/493.5; 210/502.1
[58] Field of Search ........................ 210/487, 488, 210/489, 490, 492, 493.1, 493.3, 493.5, 502.1, 504, 507, 484

[56] References Cited

U.S. PATENT DOCUMENTS

| | | | |
|---|---|---|---|
| 3,025,963 | 3/1962 | Bauer | 210/487 |
| 3,025,964 | 3/1962 | Summers et al. | 210/487 |
| 3,448,862 | 6/1969 | Kudlaty | 210/489 |
| 3,620,375 | 11/1971 | Atkins | 210/489 |
| 3,710,948 | 1/1973 | Sexton et al. | 210/484 |
| 4,104,170 | 8/1978 | Nedza | 210/490 |
| 4,225,642 | 9/1980 | Hirakawa | 210/507 |
| 4,410,427 | 10/1983 | Wydeven | 210/487 |
| 4,589,983 | 5/1986 | Wydeven | 210/487 |
| 4,728,426 | 3/1988 | Rüdinger et al. | 210/493.3 |
| 4,834,700 | 5/1989 | Kondo et al. | 493/463 |
| 5,019,254 | 5/1991 | Abrevaya et al. | 210/507 |
| 5,503,745 | 4/1996 | Ogata et al. | 210/490 |

FOREIGN PATENT DOCUMENTS

| | | | |
|---|---|---|---|
| 0582286A1 | 9/1994 | European Pat. Off. | B32B 3/28 |
| 1607665A1 | 12/1967 | Germany . | |
| 1507757 | 7/1969 | Germany . | |
| 2345820 | 4/1974 | Germany | B01D 46/02 |
| 3526572A1 | 2/1986 | Germany | B32B 1/00 |
| 3132998C2 | 4/1986 | Germany | B01D 46/02 |
| 2043483 | 10/1980 | United Kingdom | B01D 46/00 |

*Primary Examiner*—Neil McCarthy
*Assistant Examiner*—Theodore M. Green
*Attorney, Agent, or Firm*—Gary L. Griswold; Walter N. Kirn; William J. Bond

[57] ABSTRACT

The filter device (10), provided for the filtration of fluids, comprises two interconnected material structures (14,16) forming a filter unit (12). The two material structures (14,16) are mechanically stable, at least one of the two material structures (14,16) being elastically deformable. The two material structures (14,16) are connected to each other at opposite connecting sites, with one (16) of the material structures forming an arch between the connecting sites. This arch has been generated by elastic deformation of the respective material structure (16) so that this material structure (16) is mechanically biased. A stretching movement of this material structure (16) is prevented by the connection of this material structure (16) to the other material structure (14) which in turn is of substantially plane configuration and is tensioned. Each thus constructed filter unit (12) offers high stability against the forces generated by the fluid flow so that a filter element (10) comprising such filter units can be inserted without additional constructions or elements which maintain the arched structure of the curved one material structure (16).

19 Claims, 4 Drawing Sheets

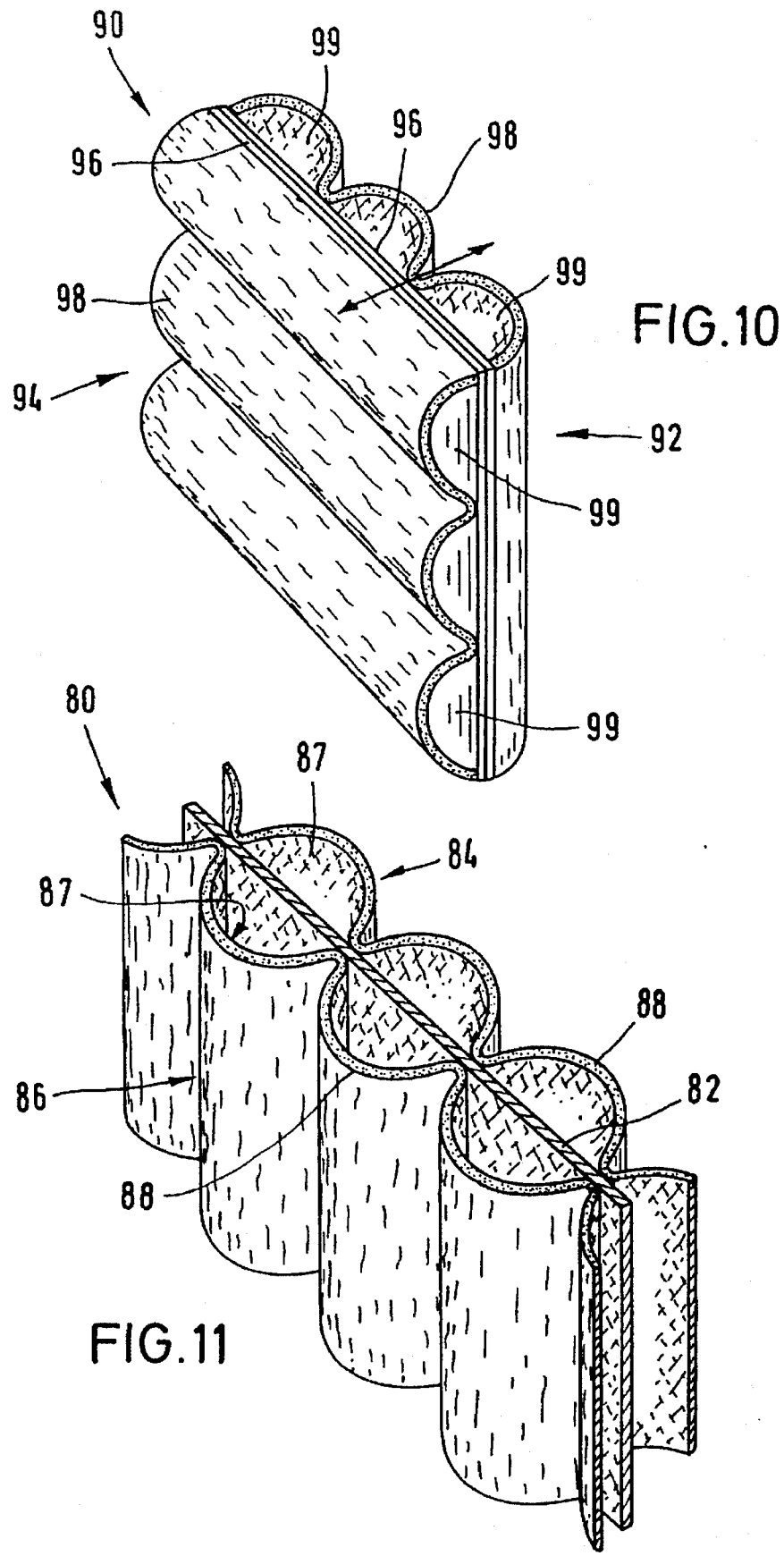

FILTER DEVICE FOR THE FILTRATION OF FLUIDS

FIELD OF THE INVENTION

The invention is directed to a filter device for the filtration of fluids, comprising at least one filter unit formed by two material structures connected to each other.

BACKGROUND OF THE INVENTION

Filter devices for the filtration of fluids are known in a wide variety of embodiments. For increasing the filtering area of the filter element exposed to the flow to be filtered, known filter elements comprise a plurality of filter material layers pleated or laid in a zig-zag or serpentine line. For stabilizing this configuration of the filter material layer, the known filter elements are provided with support structures. Examples of filter elements of this type are disclosed in EP 0 256 772 A1, DE 15 07 757 A1, DE 29 06 123 A1 and DE 35 26 572 A1. Further, there are known filter elements for bag filters consisting of a plurality of pocket-shaped filter units arranged side by side, each of these filter pockets being formed of two interconnected material structures. Such filter elements are disclosed in DE 16 07 665 A1 and DE 31 32 998 C2. The filter units of these known filter elements comprise either a rigid self-supporting filter material or filter cloths, felt materials or non-wovens. In the latter case, for creating the filter unit, a support structure must be provided which keeps the filter unit open. From DE 21 28 309 A1, there is known a filter unit for gas filters having filter materials arranged between its material structures. The gas to be cleaned flows through the material structures of the filter unit while being cleaned by the interposed filter material.

Finally, DE 23 45 820 A1 discloses a further filter element with filter units wherein the material structures consist of a material suitable for the filtration of air. As has been the case in the above filter elements comprising filter units, the shape of the filter units of this filter element is established and maintained by special support structures or by the to-be-filtered flow itself or by frame constructions.

A problem in all of the above mentioned filter elements is posed by the requirement to lend mechanical stability to the filter units so as to prevent collapse of filter units while the filter elements has the fluid streaming therethrough.

It is an object of the invention to provide a filter element which, while providing an increased filtering area, has sufficient mechanical stability without requiring separate support structures.

SUMMARY OF THE INVENTION

According to the invention, for solving the above object, there is proposed a filter device of at least one filter element for the filtration of fluids which comprises at least one filter unit formed of two interconnected material structures (at least one of them comprising a filter material or consisting of a filter material), the material structures each being mechanically stable and being connected to each other in such a manner that one material structure (subsequently called the first material structure) extends substantially in plane configuration whereas the other material structure (subsequently called the second material structure) is bent in an arch-shaped manner while being elastically deformed. Preferably, the material structures are relatively thin-faced material layers which can be one- or multi-layered.

As already explained above, the filter element of the invention comprises at least one filter unit. Of the two material structures which form the filter unit, at least one is permeable to fluid and provided with a filter material. The filter unit preferably is not filled by filtering material; the filtering effect is generated solely in that at least one of the two material structures comprises filter material. The material structures respectively consist of a mechanically stable material or include such a material, with at least one of the two material structures being elastically deformable. The two material structures are connected to each other on mutually opposite sites or regions. In this arrangement, the first material structure extends substantially in plane orientation while the second material structure has a substantially arched shape, notably under elastic deformation. In more general terms, the second material structure extends with a considerably stronger curvature than the first material structure (characterized above as extending substantially in plane orientation). Manufacture of the filter element starts with the provision of two plane material structures. These two material structures are connected to each other at a first limiting edge of the filter unit to be generated. After the second material structure has been deformed in arch-like manner, which is performed with simultaneous generation of a flexural restoring force, the two material structures are connected to each other on the other edge delimiting the filter unit. Because of its flexural elastic properties, the second material structure will tend to return to a generally plane configuration. The substantially plane first material structure receives the flexural forces issuing from the arched second material structure, and thus is subjected to tensile stress.

The filter element of the invention can be used both in the manner of a bag filter or a round filter and in the manner of a conventional pleated filter element having the flow passing therethrough in transverse direction. The term "filter unit" as used throughout the description of the instant invention, does not necessarily mean that both of the material structures forming the filter unit consist of a filter material or comprise a filter material. Further, the "material structure" is not meant to express that these structures are continuous structures. This applies especially for the substantially planar first material structure which maintains the curved structure of the second material structure. It will be sufficient if one of the two material structures consists of a continuous filter material or comprises a continuous filter material.

If desired, the second material structure can be locally weakened prior to its elastic deformation whereby the bending resistance (and stability) of the material used for this material structure is locally reduced. This weakening is effected, e.g., mechanically (provision of depressions or a thickness reduction, e.g. by way of indentation or impression) or by thermal treatment which is possible especially in case of thermoplastic materials. In the mechanically weakened region, the curvature can tend to be greater than in the remaining regions of the material structure between its connections to the first deformed material structure. However, the weakening must not be so strong that the deformation causes a kinking of the second material structure.

In a preferred embodiment of the invention, it is provided that the two material structures form two opposing sides and are connected to each other along two parallel edges forming a connecting region and delimiting the filter unit. If the filter element is employed in the manner of a bag filter—wherein the fluid flow to be filtered enters via one or more open ends of the filter unit and exits via one or both of the material structures or, respectively, enters via one or both of the material structures and exist via an open end—the filter unit is closed on at least two sides and preferably at least one end while being open on the second end. Preferably, the two material structures extend in parallel to each other and their connecting region. Since there are provided two linear and parallel connection regions connecting the material structures, the curved second material structure is deformed into a bell-shaped configuration in the cross direction. Preferably, each filter unit is provided with two side flanges in whose region the material structures abut each other and are connected to each other.

In a preferred embodiment of the invention, it is further provided that the second, curved material structure comprises an elastically deformable reticular support structure of a plastics material, preferably a thermoplastic such as polypropylene, carrying at least one layer of a non-woven filter material. This elastically deformable material is one that has a bending or flexural resistance or modulus, such that it will tend to elastically return to its original planar form when bent at an angle of deformation forming a second curved wall. Preferably, also the fibers of this non-woven filter material consist of plastics and particularly of polypropylene, having little or no resistance to bending. The non-woven filter layer is connected to the reticular support structure, which can be effected, e.g., by gluing. The fixed connection between the reticular support structure and the non-woven filter layer can extend over all or part of the contacting surface.

When using the above mentioned materials for the two material structures, the substantially plane first material structure suitably comprises merely the reticular support structure where its initial strain resistance is sufficient to at least withstand the flexural stress imposed on it by the first deformed reticular support. As an alternative, the first material structure can also comprise a combination of the reticular support structure and the non-woven filter material. In this case, connection of the two plastics walls of the pockets is preferably performed by ultrasonic welding.

Suitably, the substantially plane first material structure comprises a plurality of narrow or thin material strips or threads, preferably made of plastic, which are mechanically stable. Adjacent material strips or threads are arranged at a—preferably quite large—mutual distance and extend preferably in parallel to each other. For the strip/band material, there is suitably used a band material known from the packing industry. The strip/band material and/or thread material preferably comprises polypropylene. Put in more general terms, the materials used for the first material structure should be of such a type that the whole filter unit includes as few different materials as possible.

The advantages obtained by providing the first material structure in the form of individual, spaced strips, bands or threads, reside in a reduction of the required quantity of material and, further, in a considerably decreased pressure drop of the complete filter unit when the filter element consisting of the above strips, bands or threads has a transversal flow passing therethrough. This is because, in the above case, the first material structure—since it merely comprises individual, mutually spaced, narrow strips or threads—does not offer any noteworthy resistance to flow.

Preferably, also the reticular support structure and the non-woven filter layer of the first material structure are connected to each other only at those sites where the two material structures are connected to each other. If an ultrasonic welding technique is used for connection of the two material structures the reticular support structure and the non-woven filter layer are interconnected by the ultrasonic welding. If the curved material structure is to be locally weakened, this is effected by locally weakening the reticular support structure either by mechanical (forming a depression or a local reduction of thickness) or thermal treatment. The thus treated regions of the reticular support structure can extend parallel to the material structure connections.

Depending on the respective mechanical strength of the non-woven filter material layers, the side of the non-woven filter material facing away from the reticular support structure is preferably provided with a fluid-permeable cover layer which can comprise a tear-resistant and stable non-woven material. The cover layer is provided to prevent detachment of fibers of the non-woven filter material layer while fluid is flowing through the filter element filter unit(s).

Particular advantages are obtained when the filter element comprises an adsorptive material. In this case, it is suitable e.g. that one of the two material structures, particularly the substantially plane first material structure, is provided with adsorptive material or is made of adsorptive material. Preferably, in this case, activated carbon is used as the adsorptive material. The thus provided filter element can function both as a particle filter and an adsorption filter. In this latter case, the adsorptive material is preferably applied onto or incorporated into the fibers of a non-woven filter layer which is used as the first material structure. If, in this case, activated carbon is used as adsorptive material, the connection of the two material structures can pose problems due to the properties of the activated carbon. In this regard, the second material structure advantageously consists of a thermoplastic material, e.g. plastics and particularly polypropylene, or comprises a material which can be mechanically or adhesively connected to the activated carbon and non-woven filter layer of the first material structure by local heating and pressure. The mechanical connection is obtained by hooking the activated carbon and thermoplastic material of the second material structure which, by being heated, has passed into a fluid state, whereby the thermoplastic penetrates into the activated carbon and non-woven filter layer and, after hardening, is hooked between the individual fibers and particles which in turn are connected to each other.

The above described filter element comprises at least one filter unit which can be in the form of a filter cell. It is particularly preferred that a plurality of such filter units or filter cells are arranged next to each other, the material structures of the filter units being continuous. In this manner, there is obtained a filter element composed of a plurality of filter units arranged side by side. Because of its curved sections, this filter element has a high mechanical stability since each curvature has been generated under elastic deformation and the filter unit or the curved material structures of each filter unit offer sufficient resistance to the flow pressure of the oncoming fluid.

Still greater stability is obtained when two of the above described filter elements are interconnected while being turned relative to each other, preferably at about 90°, with the first material structures of the filter units of the two filter elements—each of them being of plane configuration—being arranged opposite each other. The filter elements are interconnected through the two first material structures. Thus, the filter units of the two filter elements of this filter device are displaced relative to each other.

On principle, however, it is also possible that the two above described interconnected filter elements, each consisting of filter units having continuous walls and being placed side by side, are connected to each other by their first material structures without being turned relative to each other. Such a filter device configuration can have the flow passing therethrough both in transverse direction and in the direction of the filter unit. In the above two cases, the two adjacent first material structures can support or hold therebetween a layer of adsorptive material, particularly a layer of activated carbon, or a layer provided with such a material.

Further, it is advantageous to arrange a further curved material structure opposite the above, second curved material structure, the two curved second material structures being arranged on both sides of one first material structure and being connected thereto. This provides for a filter element with a "double pocket", comprising two filter units delimited by one substantially plane first material structure. The separating wall of the pockets, i.e. the substantially plane and tensioned first material structure of this filter element, can advantageously be provided with adsorptive material, preferred use being made of activated carbon for this purpose.

It is a common feature of all of the above described variants and modifications of the filter element of the invention that the respective curved second material structure(s) of a filter unit has been formed under elastic deformation, and therefore said curved second material structure(s) has a high mechanical stability with respect to the fluid flow, when deformed.

Specific embodiments of the invention will be described in greater detail hereunder with reference to the Figures.

BRIEF DESCRIPTION OF THE DRAWINGS

FIG. 10 is a perspective view of a filter device comprising two filter elements having filter pockets arranged side by side and being connected to each other at a turning angle of 90° relative to each other;

FIG. 11 is a perspective view of a filter device similar to that of FIG. 9, the pocket separating wall consisting of a reticular material.

DETAILED DESCRIPTION OF THE INVENTION

Figure 12:
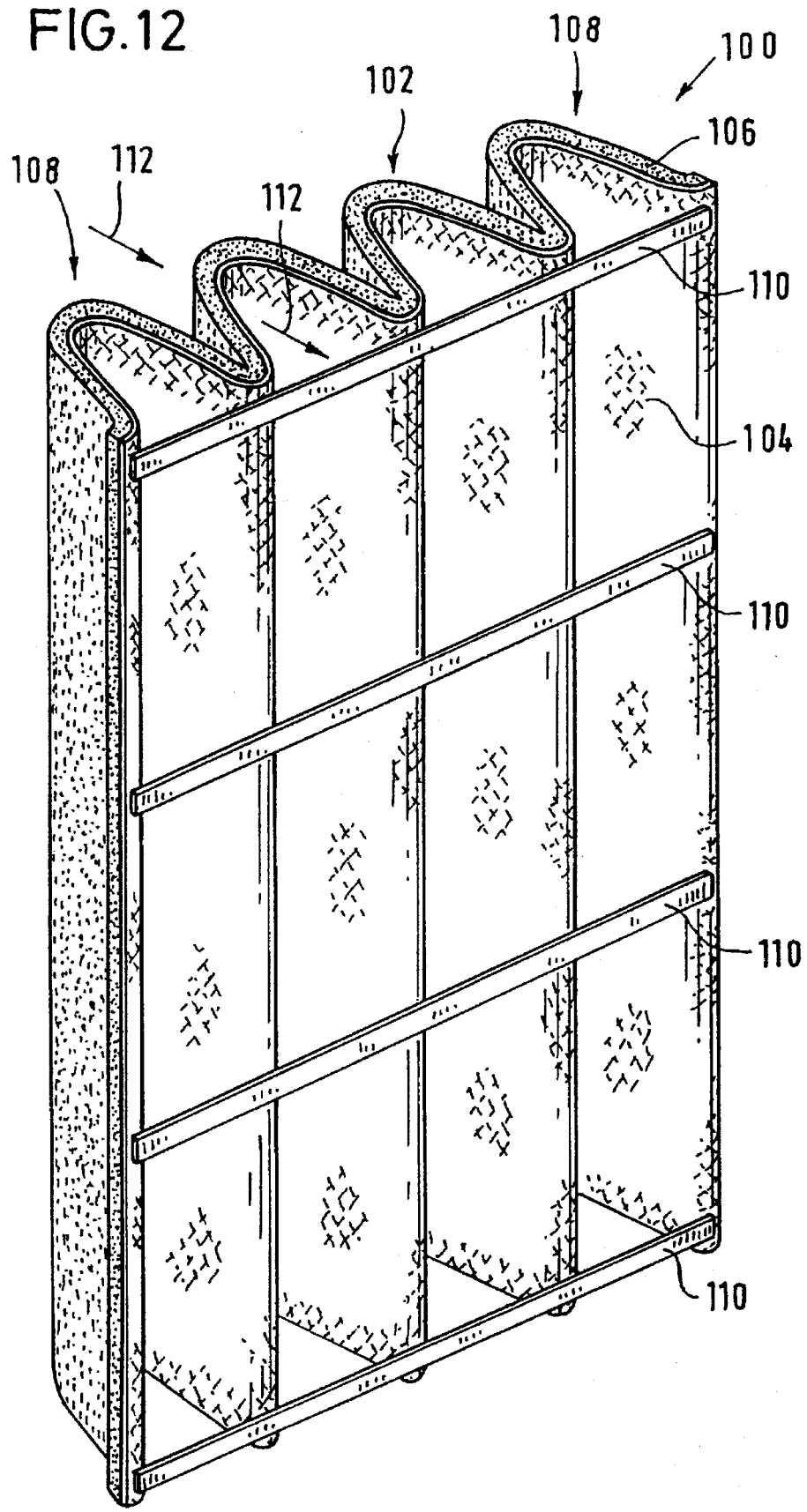
FIG. 12 shows a last embodiment of a filter element wherein the filter pocket is formed by a curved wall comprising a filtering medium and by individual plastic strips connected to said curved structure.

In the following detailed description, embodiments will be explained wherein the filter units are formed in the manner of pockets (cf. FIGS. 1 to 11). In these embodiments, the filter units comprise continuous material structures at least one of which, in as far as required for particle filtration, is permeable to fluid. Additionally, the last FIG. 12 shows a filter element wherein the first material structure not provided for filtration is non-continuous and consists merely of strips, bands or rigid threads, which preferably have a bending resistance in the plane of the first material structure.

Figure 1:
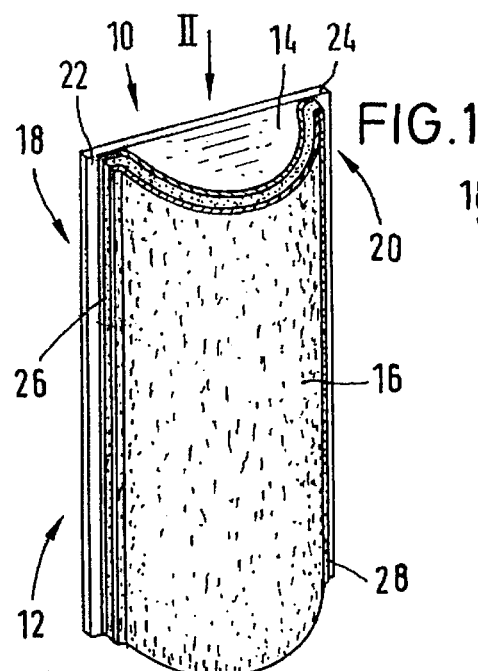
FIG. 1 is a perspective view of a filter element comprising one (sole) filter pocket.
Figure 2:
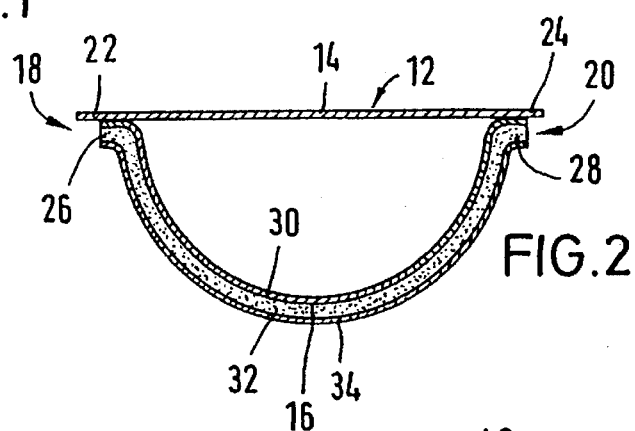
FIG. 2 is a view of the filter element according to FIG. 1 in the direction of the open end thereof as indicated by arrow II of FIG. 1.

FIG. 1 is a perspective view of a filter element 10 according to a first embodiment of the invention. The filter element 10 comprises a filter unit 12 formed as a pocket, to be called a filter pocket hereunder. Filter pocket 12 comprises a first, substantially plane material structure 14 (also called a pocket wall) and a second material structure 16 substantially curved in the manner of a bell (likewise called a pocket wall). Both of the pocket walls are made of a mechanically stable material. Filter pocket 12 has each of its two longitudinal sides provided with a flange 18,20 in whose region the two pocket walls 14,16 are tightly connected to each other. As can be seen in FIG. 2, the two pocket walls 14,16 are in mutual abutment on their edges 22,24,26,28 forming the flange 18,20, with the edges 22,24 of the first pocket wall 14 each extending in parallel to the edges 26,28 of second pocket wall 16. In the filter element according to FIG. 1, the actual particle filter is formed by the curved second pocket wall 16 which, as can be seen in FIG. 2, is multi-layered. The second pocket wall 16 comprises a plastic, elastically deformed reticular support structure 30, preferably a thermoplastic having a Young's or flexural modulus sufficient to form an elastically deformed support, e.g. isostatic polypropylene, carrying a non-woven filter layer 32, the fibers of layer 32 also consisting of polypropylene. On the outer side of non-woven filter layer 32 facing away from reticular support structure 30, there is applied a cover layer 34 which is a non-woven having a tear resistance several times as large as that of non-woven filter layer 32. As shown in FIG. 2, the reticular support structure 30 forms the inner side of second pocket wall 16 confronting the first pocket wall 14, while cover layer 34 forms the outer side of second pocket wall 16. The non-woven filter layer 32 is arranged between the reticular support structure 30 and the cover layer 34. The first pocket wall 14 in FIG. 1 does not serve for particle filtration but does assist the second pocket wall 16 to maintain its arched shape. The first pocket wall 14 comprises the material of reticular support structure 30.

The reticular support structure 30 lends a certain degree of bending resistance to the second material structure or pocket wall 16, the second pocket wall 16 being elastically deformed because of reticular support structure 30. This bending resistance is particularly high in the direction perpendicular to the direction in which the second pocket wall is elastically deformed. The second pocket wall 16 attains its shape due to the manufacturing process. While being elastically deformed, the second pocket wall 16 obtains its curved bell-shape before both pocket walls are connected to each other. The elastically deformed second pocket wall 16 tends to assume a plane configuration, but is prevented from assuming a plane configuration, due to its tight connection to the first pocket wall 14 which has a considerably smaller width dimension than the second pocket wall 16. Connection of both pocket walls to each other is carried out, e.g., by ultrasonic welding, which seems suitable if both walls include polypropylene as a component. Due to the mechanical bias from elastically deformed pocket wall 16, filter pocket 12 has a considerable stability so that it will maintain its opened structure even when a gas or a liquid (fluid) flows through filter element 10. Particularly, the bias will counteract forces acting on the second pocket wall 16 from outside and thus resists mutual abutment of the two pocket walls.

Figure 3:
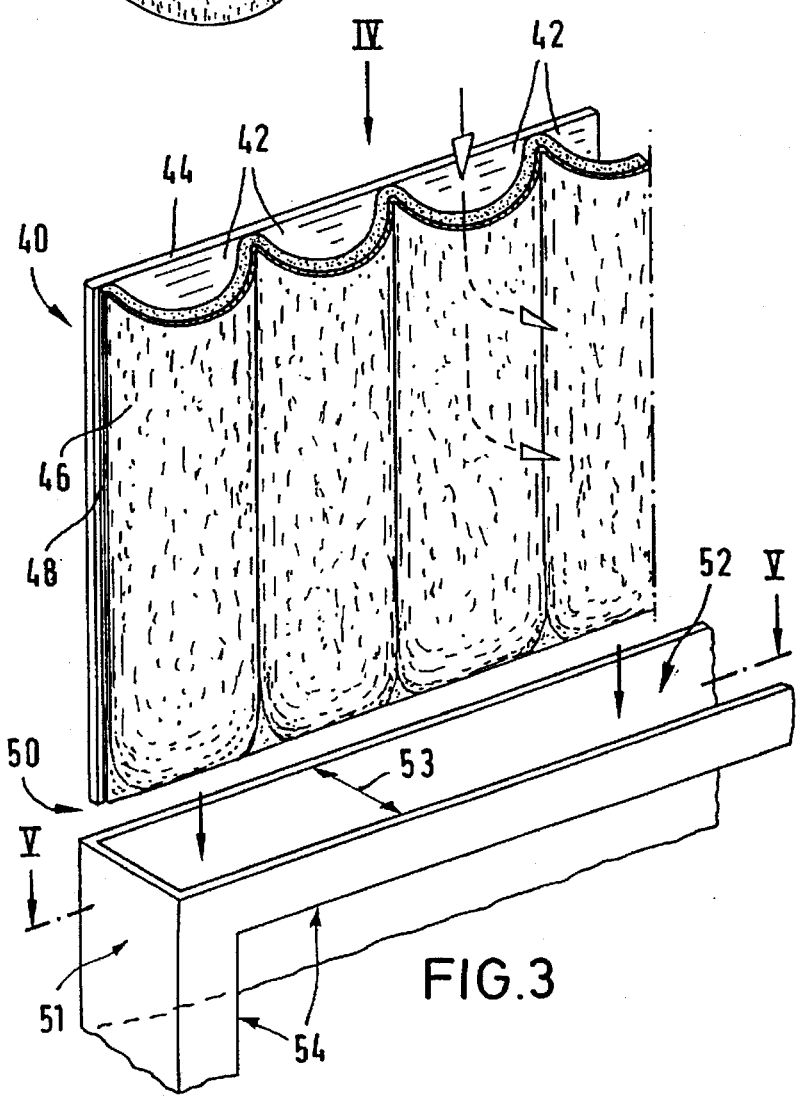
FIG. 3 is a view of a filter element comprising a filter layer with filter pockets arranged side by side, shown together with a filter element accommodating housing.
Figure 4:
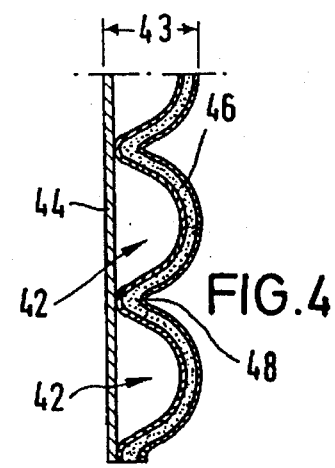
FIG. 4 is a view of the filter element according to FIG. 3 in the direction of arrow IV.

FIG. 3 shows a further embodiment of a filter element 40, comprising a plurality of filter pockets 42 arranged side by side. These filter pockets 42 extend in parallel to each other and are situated immediately adjacent each other. Filter element 40 comprises a continuous first pocket wall 44 which is rectangular and substantially plane. This first pocket wall 44 can comprise a filter material or can consist of another material being permeable to fluid and not provided for filtration, or of a material impermeable to fluid. Pocket wall 44 has a second pocket wall 46 connected thereto, which, being elastically deformed, constitutes arcuate sections and is connected to first pocket wall 44 along parallel connecting lines 48. The configuration of second pocket wall 46 corresponds to pocket wall 16 of the embodiment according to FIGS. 1 and 2. Thus, pocket wall 46 forms the particle filter. At the lower end, the filter pockets 42 are closed in that the pocket walls 44,46 are tightly connected to each other at the lower ends 50 of the filter element 40. Also the connection of pocket walls 44,46 along the connecting lines 48 at the edges of filter pockets 42 as well as at the lower end 50 of filter element 40 is preferably accomplished by ultrasonic welding if the whole filter element 40 is made of plastics. The thus formed filter pockets 42 between the pocket walls 44,46 are quite stable so that the filter element 40 is easily handled.

Figure 5:
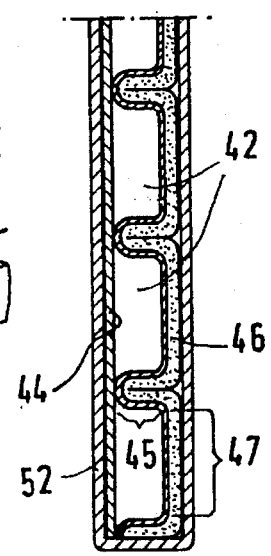
FIG. 5 is a cross section along the line V—V of FIG. 3 wherein the filter element has been inserted into the filter element accommodating housing.

In connection to FIG. 5 and with reference to the filter element 40 of FIG. 3, a further feature of the inherently tensioned one pocket wall 46 will be explained hereunder. As shown in FIG. 3, filter element 40 is inserted into the insert opening 52 of a filter element accommodating housing 51. The width 53 of the insert opening 52 in this case is smaller than the distance 43 between the respective apexes of the pocket wall 46 with the curved sections and the plane pocket wall 44. Accordingly, when the filter element 40 is inserted into insert opening 52, the pocket wall 46 compresses, forming plane sections arranged in parallel to pocket wall 44. Because of the outwardly protruding structure of pocket wall 46, the filter element can be "flattened" without the individual filter pockets 42 collapsing. In case of a suitably small-dimensioned insert opening 52 width 53 (generally, width 53 will be between 0.5 and 0.65 times that of width 43), the side portions 45 of pocket wall 46 lie against each other between the flattened plane portions 47 of pocket wall 46 sealing the space between the filter pockets 42. Thus, filter element 40 is tightly seated in insert opening 52 so that the fluid flowing into insert opening 52 can penetrate: neither into the spaces between filter element 40 and accommodating housing 51 nor between filter pockets 42, but will always flow into the open ends of filter pockets 42 wherefrom it will exit via pocket wall 46. To this purpose, an opening 54 is formed in a side wall of accommodating housing 51 opposite pocket wall 46.

Figure 6:
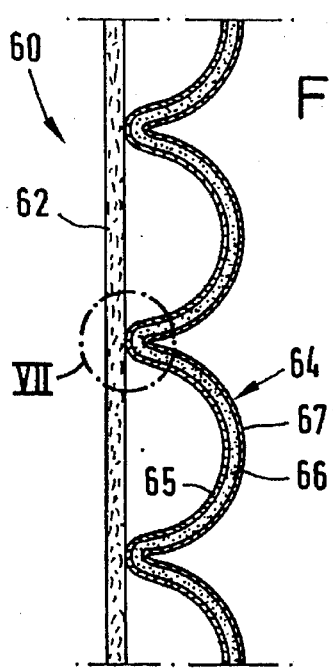
FIG. 6 is a plan view of the open ends of the filter pockets of a filter layer of a filter element with an activated carbon layer.
Figure 7:
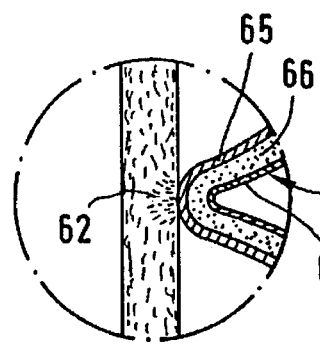
FIG. 7 is an enlarged partial view of the area encircled at VII in FIG. 6.
Figure 8:
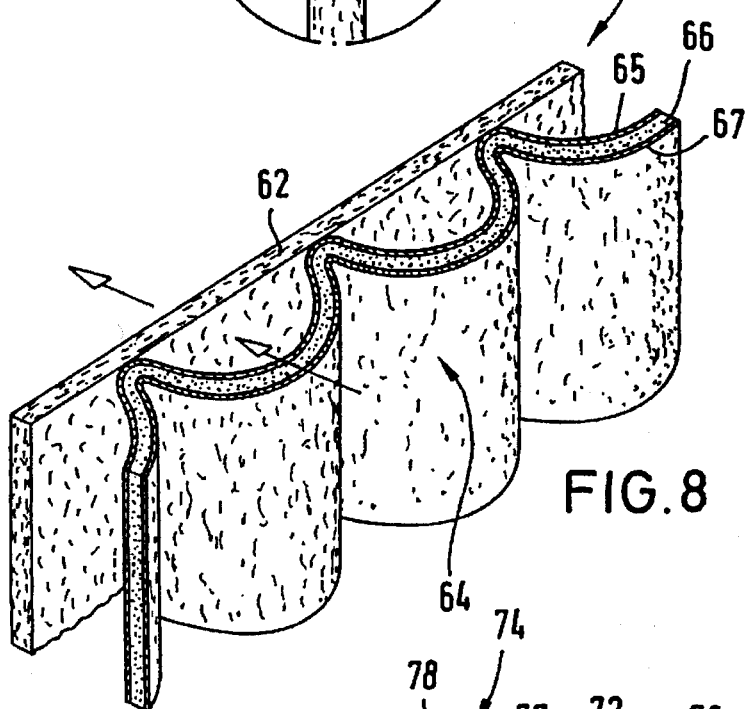
FIG. 8 is a perspective view of the filter element according to FIG. 6 for illustrating the direction of the fluid flow.

FIGS. 6 to 8 show a further embodiment of a filter element 60. In this filter element 60, the first plane pocket wall 62 comprises a comparatively thick non-woven made of thermoplastic fibers (e.g. polypropylene) which are coated with, or have entrapped, activated carbon. As a material for the pocket wall 64 with the elastically deformed sections, there is used a composite formed of thermoplastic material comprising an elastically deformable reticular support structure 65 of polypropylene, a non-woven filter layer 66 of polypropylene fibers and a cover layer 67 which, being a tear-resistant non-woven, also consists of polypropylene fibers as is the case in the above described embodiments. Because of the activated carbon in pocket wall 62, connecting the two pocket walls 62 and 64 by ultrasonic welding causes problems because the melting point of the material of the reticular support structure 65 (as well as the melting point of the non-woven layers 66 and 67) is lower than that of the activated carbon. Upon welding, generally only the material of reticular support structure 65 (the plastic fibers of plane pocket wall 62 are protected by the carbon particle) will be softened. However, because of the pressing force exerted along the welding seam during ultrasonic welding, this material, which at least has passed into a viscous state, is pressed between the non-woven fibers of pocket wall 62, entering the space between individual fibers of pocket wall 62, partially flowing around the fibers and carbon particles and thus enclosing them. Therefore, after hardening, the two pocket walls are mechanically hooked and adhesively bonded into each other along the "welding seams" so that the connection between the two pocket walls is sufficiently stable for resisting the mechanical stress lent to pocket wall 64 due to the elastic deformation. The locking of the pocket wall 64 with its curved sections in the activated carbon containing pocket Wall 62 is illustrated in FIG. 7.

Figure 9:
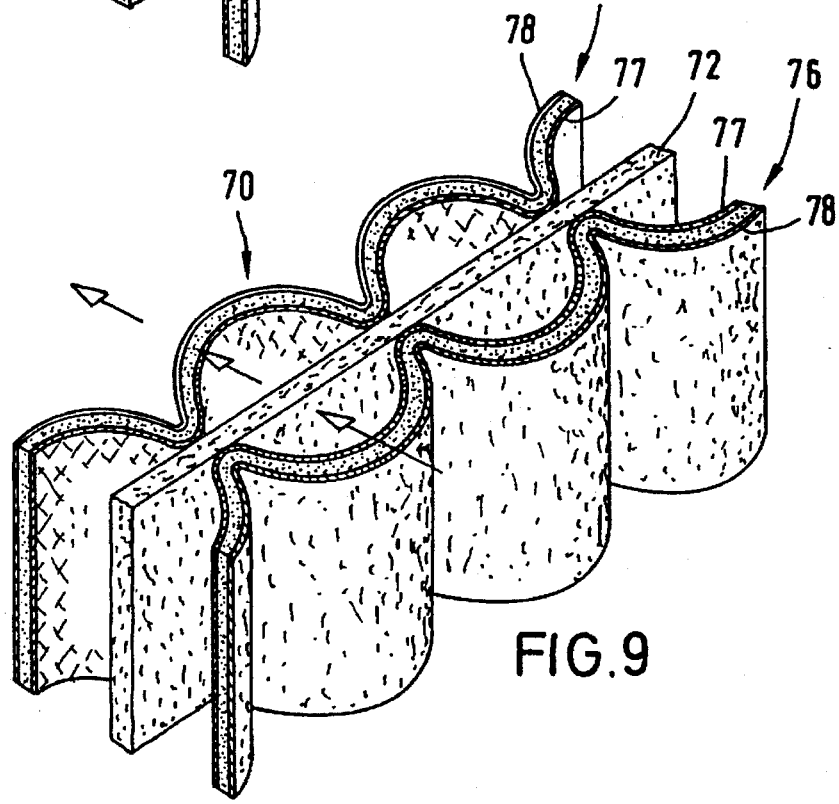
FIG. 9 is a perspective view of a further embodiment of a filter device with double filter pockets arranged side by side and being separated from each other by a continuous activated carbon filter layer.

FIG. 9 shows a filter device 70 comprising a central, substantially plane pocket or partition wall 72 and pocket walls 74,76 arranged on both sides thereof and connected to partition wall 72, said pocket walls 74,76 comprising curved sections obtained by elastic deformation. The curved sections of pocket walls 74,76 are arranged opposite each other and, along connecting lines, are connected to the central pocket wall 72 by ultrasonic welding. While the pocket walls 74,76 each comprise a reticular support structure 77 of polypropylene with a non-woven filter layer 78 held by support structure 77, the central pocket wall 72 comprises a filtering element made from bonded activated carbon granules. The activated carbon granules are bonded by suitable thermoplastic binder particles of a size less than that of the activated carbon granules. When a transverse flow is passing through filter device 70 in the direction indicated by the arrow in FIG. 9, the curved pocket walls 74,76 take over the function of particle filters while the above filtering element of activated carbon of the central partition wall 72 acts as an adsorption filter. Carbon particles becoming detached from the filtering element are stopped and retained by the curved pocket wall 74 located downstream.

FIG. 11 shows an embodiment of a filter device which, as has been the case for the filter element 70 of FIG. 9, comprises two opposing pocket walls with curved sections, but, in contrast to the filter device 70 of FIG. 9, has a central pocket wall which is not used for filtration purposes. The substantially plane and stressed central pocket wall 82 of filter device 80, according to FIG. 11, is formed of a reticular support structure of polypropylene; this reticular support structure is the same reticular support structure which is also a component 87 of the pocket walls 84,86 with the curved sections. The reticular support structures 87 of these two curved pocket walls 84,86, respectively, carry non-woven filter layers 88 for the filtration of particles. As is the case in the filter elements shown in the remaining Figures, the filter device 80 of FIG. 11 can be used as a bag filter or can have the flow passing therethrough in a transverse direction for particle filtration.

Still one more embodiment of a filter device is shown in FIG. 10. This filter device 90 has two filter elements 92,94, each of them comprising a substantially plane pocket wall 96 and an elastically deformed pocket wall 98 having curved sections and being connected to the plane pocket wall 96. Thus, each of the filter elements 92,94 comprises a plurality of filter pockets 99 arranged side by side and being formed by a section of the plane pocket wall 96 and a curved section of pocket wall 98. The two filter elements 92,94 are connected to each other in such a manner that their plane pocket walls 96 are in mutual abutment, the filter elements 92,94 being displaced relative to each other at a rotational angle of 90°. Thus, there is provided a filter device 90 offering a considerable resistance against twisting, torsion and the like. The filter device 90 according to FIG. 10 is primarily used as a transverse filter which is illustrated by the double arrow pointing to the possible flow directions.

FIG. 12 shows a final embodiment of a filter element 100 which is provided with a curved second material structure 102. This curved second material structure 102 comprises a support structure 104 made from polypropylene, as in the above described embodiments. The reticular support structure 104 carries a layer 106 of non-woven filter material made from polypropylene fibers. The reticular support structure 104 and the non-woven filter layer 106 are curved in sections so that individual filter units 108 are adjacent to each other. This arched structure of the filter element 100 is maintained by a first material structure of individual material bands or strips 110 of polypropylene. These strips 110 extend in parallel and at periodic distances and are arranged transverse to the axial direction of the individual filter units 108. The material strips 110 form the substantially plane first material structure which in the above described embodiments is provided as a fluid-permeable or a fluid-impermeable continuous layer. In comparison to the above continuous first material structure layers, the material used for the material structure consisting of the individual bands 110 is reduced by up to 90%. This provides for a corresponding reduction of material costs of up to 90%. When using the filter element 100 as a transverse filter, with the transverse fluid flow being indicated by arrow 112, the flow resistance of filter element 100, is considerably lower than when the first material structure is continuous. The material of the bands or strips 104 is usually a strapping material used to wind around packages.

Strapping material of the above type has a width of about 5 mm and a thickness of about 0.46 mm and is made from oriented polypropylene. The bands 110 can be easily connected to the polypropylene support structure 104 by ultrasonic welding.

Finally, a short explanation will be given on a possible manufacturing process for producing the basic structure which is common to all of the above filter device or elements, i.e. the connection of a plane pocket wall to a second pocket wall having one or more elastically deformed curved sections. The two pocket walls or material structures to be connected (i.e. the pocket walls in the embodiments according to FIGS. 1 to 11, and the filtering non-woven with the reticular support structure and the bands in the embodiment according to FIG. 12), being arranged on top of each other as endless sheets, are supplied to a processing station wherein they are connected to each other. The transport of that sheet which later will form the plane pocket wall is temporarily stopped, while the supply of the other sheet which later will form the elastically deformed pocket wall with the curved sections is continued. If the filter pocket to be produced is the first one in the process, both of the sheets are held together by a stationary holding or clamping means arranged behind the connecting station. Since the one sheet has been stopped while the other sheet is advanced in the transport direction, this other sheet is being elastically deformed while forming an arch. This arch is generated between the holding or clamping station and the connecting station. By suitable selection of the amount by which the latter sheet is advanced while the former sheet is stopped (the latter sheet overfeed), the size (and the configuration) of the presently generated arch are determined. After the sheet provided for forming the elastically deformed pocket wall with the curved sections has been advanced by a predetermined distance, the advance movement of this sheet is also stopped. Since the two sheets are still in mutual abutment in the connecting station, an elastically deformed arch-shaped section has been formed between the holding or clamping station and the connecting station. At this stage, connection of the two filter sheets is performed in the connecting station. This can be done in many different manners, such as by ultrasonic welding, gluing or connection through additional mechanical means such as, for instance, sewing, clamping and the like. When the two sheets have been connected to each other, they are advanced in the transport direction together again, the advance distance being equal to the dimension of the formed filter pocket in the transport direction. As soon as the connecting site is located at the position of the holding or clamping station, the advance movement of the sheet provided for forming the plane pocket wall is stopped again while the other sheet is further advanced, so that the above described working process for forming the next filter pocket is started again. In this situation, it is not required that the two sheets are held together by the holding or clamping station because these two sheets have been previously connected to each other in the connecting station. For preventing advance movement of the one sheet while the other sheet is being transported, further transport of the one sheet can be blocked by a holding means arranged before the connecting station. Alternatively, the advance drive for this sheet can be switched off.

For the production of filter elements having the configuration according to FIGS. 9 and 10, three sheets instead of two sheets are supplied while being arranged above and in abutment with each other. In this case, the intermediate sheet is temporarily stopped while the other two sheets, for forming a respective arch above and below the intermediate sheet, are advanced by a specific distance and subsequently all three of the sheets are connected to each other.

For a material for the thermoplastic reticular support structure there was used a netting of polypropylene, said polypropylene being distributed by the firm Hoechst (code designation PPH 1050). The openings of the netting were nearly rectangular. The netting had a weight of about 160 g/m$^2$. The thickness of the netting was about 0.64 mm, the width of the netting bars between the openings being about 0.84 mm. The openings had a size of about 4.11 mm$^2$, resulting in a number of 102 netting openings in a netting surface of 9 cm$^2$. The percentage of the opening areas relative to the overall area of the netting was about 46.5 percent. The material for the non-woven layer of the filter material was an electric material provided as a non-woven material of needle-punched polypropylene fibers having an average fiber thickness of about 40 to 50 µm. For the cover layer, there was used a non-woven fiber material of polypropylene fibers thermally bonded to each other, their average fiber thickness being about 40 to 50 µm.

We claim:

1. A filter device for the filtration of fluids, comprising at least one filter element comprising at least one filter unit formed of a first material structure extending in a planer configuration and a second material structure which is curved in a substantially curved shape which first and second material structures are mechanically stable and connected to each other and of which at least the second material structure comprises a filter material, wherein the second material structure is formed from a plastic, elastically deformed support structure curved in at least one substantially curved shape while being elastically deformed and attached to the support structure is a fibrous filter material having little or no resistance to bending, which second material structure is connected to said first material structure at two adjacent side edges of each curved shape, the side edges forming side flanges of said filter unit limiting each curved shape, wherein said support structure is elastically deformed and generates flexural restoring forces such that when the first and second material structures are connected, the substantially planar first material structure receives the flexural and restoring forces from the substantially curved second material structure thus subjecting the first material structure to tensile stress while the curved shape of the second material structure provides mechanical stability resisting deformation of the second material structure by fluid flow during filtration.

2. The filter device according to claim 1, wherein the first material structure consists of a filter material and/or includes filter material.

3. The filter device according to claim 1, wherein both material structures consist of a filter material and/or include filter material.

4. The filter device according to claim 1, wherein the two material structures are connected to each other continuously or periodically or point-wise along two mutually parallel lines, one each at each of said two adjacent side edges.

5. The filter device according to claim 1, wherein the two material structures in the regions of their connections extend in parallel to each other and that the second, curved shape material structure plastic support structure between its connections with the first material structure is elastically deformed in the shape of a bell in a cross sectional dimension.

6. The filter device according to claim 1, wherein each at least one filter unit is provided with two side flanges, the material structures being in abutment with each other and being connected to each other in the region of said side flanges.

7. The filter device according to claim 1, wherein the second, curved shape material structure is bell-shaped and is formed of an elastically deformable reticular support structure of a plastic material, carrying at least one layer of a non-woven filter material as said filter material.

8. The filter device according to claim 7, wherein a fluid-permeable cover layer is applied on the non-woven filter material of the second, curved bell-shaped material structure.

9. The filter device according to claim 1, wherein the second material structure comprises individual material strips and/or material threads which are connected to the first material structure.

10. The filter device according to claim 1, wherein the first material structure is formed by a rectangular support structure.

11. The filter device according to claim 1, wherein the at least one filter unit has an open end and a closed end, the two material structures being connected to each other continuously or periodically or point-wise at said adjacent side edges in the region between said two ends of the filter unit.

12. The filter device according to claim 1, wherein the first material structure comprises an adsorptive material.

13. The filter device according to claim 12, wherein the first material structure fibrous filter material comprises a non-woven filter layer, said non-woven filter layer containing an activated carbon particulate adsorptive material.

14. The filter device according to claim 13, wherein the second material structure comprises a thermoplastic material and is mechanically connected to the activated carbon non-woven filter layer by heating and application of pressure.

15. The filter device according to claim 1, wherein a plurality of filter units are arranged side by side forming said filter element, the two material structures forming the individual filter units being continuous.

16. The filter device according to claim 15, wherein two filter elements are provided, each of them comprising a plurality of filter units arranged side by side, the two first material structures of the filter units of said two filter elements confronting each other.

17. The filter device according to claim 16, wherein the two filter elements are connected to each other at an angle of 90° relative to each other.

18. The filter device according to claim 1, wherein at least one further filter unit is provided, with the respective substantially plane first material structures of each filter unit abutting each other.

19. The filter device according to claim 1, wherein the first material structure is connected to a further second material structure curved under elastic deformation and that the two second material structures are arranged on opposite sides of one first material structure.

* * * * *